United States Patent [19]

El-Hamamsy

[11] Patent Number: 5,118,997
[45] Date of Patent: Jun. 2, 1992

[54] DUAL FEEDBACK CONTROL FOR A HIGH-EFFICIENCY CLASS-D POWER AMPLIFIER CIRCUIT

[75] Inventor: Sayed-Amr A. El-Hamamsy, Schenectady, N.Y.

[73] Assignee: General Electric Company, Schenectady, N.Y.

[21] Appl. No.: 745,653

[22] Filed: Aug. 16, 1991

[51] Int. Cl.[5] .............................. H05B 41/24
[52] U.S. Cl. ................... 315/248; 315/311; 315/284; 330/207 A; 330/251
[58] Field of Search ............ 315/248, 310, 311, 307, 315/224, 209 R, 219, DIG. 7, 284; 330/207 A, 251, 291, 294

[56] References Cited

U.S. PATENT DOCUMENTS

| | | | |
|---|---|---|---|
| 3,899,745 | 8/1975 | Fletcher | 330/207 A |
| 4,383,203 | 5/1983 | Stanley | 315/248 |
| 4,628,275 | 12/1986 | Skipper | 330/251 |
| 4,783,615 | 11/1988 | Dakin | 315/248 |
| 4,812,702 | 3/1989 | Anderson | 313/153 |
| 5,023,566 | 6/1991 | El-Hamamsy et al. | 330/251 |
| 5,063,332 | 11/1991 | El-Hamamsy | 315/248 |

Primary Examiner—Eugene R. LaRoche
Assistant Examiner—Amir Zarabian
Attorney, Agent, or Firm—Jill M. Breedlove; James C. Davis, Jr.; Marvin Snyder

[57] ABSTRACT

A dual feedback control system for a Class-D power circuit maximizes efficiency by controlling the magnitude and phase angle of the resonant load circuit using two separate feedback loops. The first feedback loop changes the value of a first variable capacitor in response to difference in magnitude between the actual load impedance and the desired load impedance. The second feedback loop changes the value of a second variable capacitor in response to the phase difference between the actual phase angle and the desired phase angle. In this way, the real and imaginary components of the load impedance are controlled so that the Class-D circuit is in tune, and hence efficiency is maximized, over a wide range of load impedances. The dual feedback control of the present invention may be advantageously employed in the ballast of an electrodeless HID lamp system.

8 Claims, 4 Drawing Sheets

DUAL FEEDBACK CONTROL FOR A HIGH-EFFICIENCY CLASS-D POWER AMPLIFIER CIRCUIT

FIELD OF THE INVENTION

The present invention relates generally to Class-D power amplifier circuits and, more particularly, to a feedback control system having two feedback loops for respectively adjusting the phase and magnitude of the load impedance to maximize efficiency.

BACKGROUND OF THE INVENTION

Resonant circuits, such as Class-D power amplifiers, are typically controlled by varying the operating frequency in the feedback system. In some cases, the circuit is made to lock into the resonant mode of the load circuit. In other cases, such as zero-voltage switching quasi-resonant converters, there is a fixed on-time for the active devices, and the devices are turned off when a predetermined condition is detected, e.g., when the device voltage crosses zero. For some Class-D systems, however, the range of frequency variation is limited, thus reducing its effectiveness as a control variable. For example, in a high intensity discharge lamp (HID) system, which typically includes a Class-D ballast, the operating frequency is in the Industrial, Scientific and Medical (ISM) bands of the electromagnetic spectrum wherein moderate amounts of electromagnetic radiation are permissible, since such radiation is generally emitted by an electrodeless HID lamp. Suitable operating frequencies for an HID lamp ballast are in the range from 0.1 MHz to 30 MHz, exemplary operating frequencies being the ISM bands at 6.78 MHz, 13.56 MHz and 27.12 MHz. The ISM bands are very narrow, and radiation outside these bands is strictly controlled. Hence, the range of frequency variation in an HID lamp system is limited. As a result, frequency is not a suitable feedback control variable in a Class-D HID lamp system.

In an HID lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

As mentioned hereinabove, a suitable ballast for an electrodeless HID lamp comprises a Class-D power amplifier. Operation of such a ballast at the series resonant frequency of the load circuit maximizes power output. However, operation at a frequency slightly higher than the series resonant frequency of the load circuit maximizes ballast efficiency. Hence, for maximum efficiency, operation is slightly "off" resonance, and a specific ballast load resistance and phase angle are required. To this end, the impedance of the ballast load, including that of the arc discharge as reflected into the ballast load, must be matched to the required ballast load resistance and phase angle. As described in commonly assigned, copending U.S. patent application of J. C. Borowiec and S. A. El-Hamamsy, Ser. No. 472,144, filed Jan. 30, 1990, now allowed, which is incorporated by reference herein, a capacitance connected in parallel with the excitation coil is needed to match the resistive component of the ballast load impedance, and a capacitance connected in series with the excitation coil is needed to obtain the proper phase angle. However, although the series and parallel tuning capacitances provide a matched impedance under lamp-operating, or running, conditions, the output impedance of the ballast load circuit is different under starting conditions. Furthermore, in order to ensure that enough power is provided to start the lamp, the ballast should be tuned under starting conditions. Thereafter, i.e. after the lamp has started, the ballast must be tuned under running conditions for maximum efficiency operation. An automatically variable capacitor for maintaining an electrodeless HID lamp ballast in tune under both starting and running conditions is described in commonly assigned U.S. patent application of S. A. El-Hamamsy and J. C. Borowiec, Ser. No. 534,574, filed Dec. 5, 1989, which application is incorporated by reference herein. As described in the El-Hamamsy et al. patent application, Ser. No. 534,574, a piezoelectric actuator is used to vary the distance between the conductive plates of a variable capacitor by moving a movable plate with respect to a fixed plate in response to a control signal.

A closed-loop control system for a Class-D power circuit having a variable output resonant circuit impedance, such as the HID lamp system described hereinabove, is described in commonly assigned, copending U.S. patent application no. 631,836 of S. A. El-Hamamsy and J. C. Borowiec, filed Dec. 21, 1990, which is incorporated by reference herein. U.S. patent application Ser. No. 631,836 describes a feedback control system for controlling the phase angle between the resonant load voltage and current to achieve high efficiency over a range of load impedances. For some applications, however, it is desirable to operate over an even wider range of load impedances. For example, it may be desirable to use the same Class-D type ballast to operate a variety of lamps at high efficiency.

Accordingly, it is an object of the present invention to provide a new and improved closed-loop control system operating at high efficiency over a very wide range of load impedances.

SUMMARY OF THE INVENTION

A dual feedback control system for a Class-D power circuit maximizes efficiency by controlling the magnitude and phase angle of the resonant load circuit using two separate feedback loops. In a preferred embodiment, the first feedback loop changes the value of a first variable capacitor in response to difference in magnitude between the actual load impedance and the desired load impedance. The second feedback loop changes the value of a second variable capacitor in response to the phase difference between the actual phase angle and the desired phase angle. In this way, the real and imaginary components of the load impedance are controlled so that the Class-D circuit is in tune, and hence efficiency is maximized, over a wide range of load impedances.

The dual feedback control of the present invention may be advantageously employed in the ballast of an electrodeless HID lamp system.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
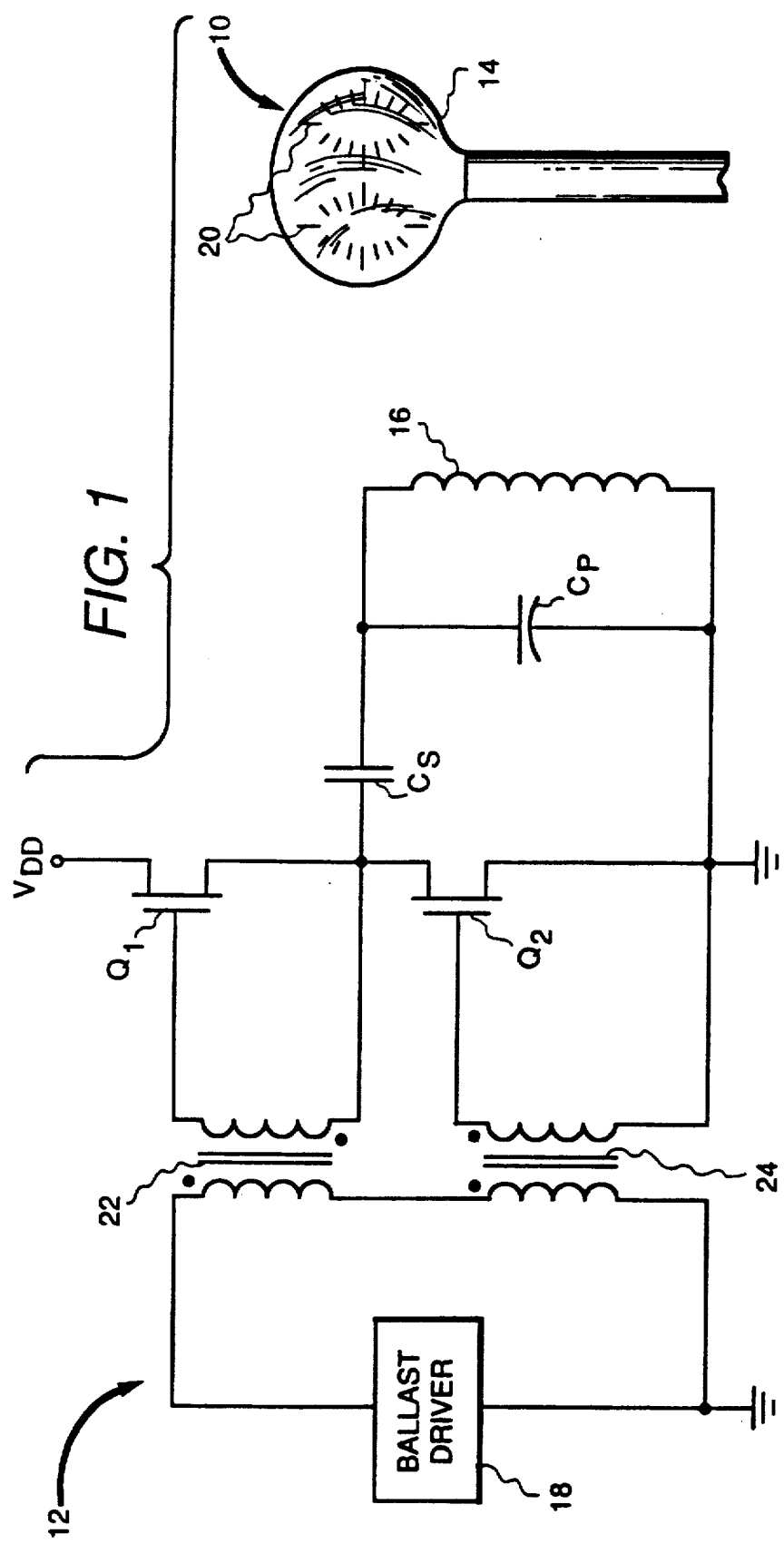
FIG. 1 is a schematic illustration of a Class-D HID lamp ballast.

FIG. 1 illustrates an exemplary Class-D power amplifier circuit which may be suitably controlled using the dual feedback system of the present invention. In particular, by way of example, the Class-D system of FIG. 1 is shown as comprising an electrodeless HID lamp 10 and associated Class-D ballast 12. It is to be understood, however, that the principles of the present invention apply equally to any Class-D power amplifier circuit; the Class-D HID lamp system is shown and described by way of example only.

As shown in FIG. 1, HID lamp 10 includes an arc tube 14 formed of a high-temperature glass, such as fused quartz, or an optically transparent ceramic, such as polycrystalline alumina. Arc tube 14 contains a fill which may comprise at least one metal halide, such as sodium iodide, and a buffer gas, such as xenon. Electrical power is applied to the HID lamp by an excitation coil 16 disposed about arc tube 14 which is driven by an RF signal via a ballast driver 18 and ballast 12. (For clarity of illustration, coil 16 is not shown in its operational position about arc tube 14.) A suitable excitation coil 16 may comprise, for example, a two-turn coil having a configuration such as that described in commonly assigned, copending U.S. patent application of G. A. Farrall, Ser. No. 493,266, filed Mar. 14, 1990, now allowed, which patent application is incorporated by reference herein. Such a coil configuration results in very high efficiency and causes only minimal blockage of light from the lamp. The overall shape of the excitation coil of the Farrall application is generally that of a surface formed by rotating a bilaterally symmetrical trapezoid about a coil center line situated in the same plane as the trapezoid, but which line does not intersect the trapezoid. However, another suitable coil configuration is described in commonly assigned U.S. Pat. No. 4,812,702 of J. M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself. Current flows through the fill within arc tube 14 as a result of this solenoidal electric field, producing a toroidal arc discharge 20 in arc tube 14. The operation of an exemplary HID lamp is described in commonly assigned Dakin U.S. Pat. No. 4,783,615, issued on Nov. 8, 1988, which patent is incorporated by reference herein.

As shown in FIG. 1, ballast 12 comprises a Class-D power amplifier including two switching devices $Q_1$ and $Q_2$ connected in series with a dc power supply $V_{DD}$ in a half-bridge Configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 18 via input isolation transformers 22 and 24, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 18 may comprise means for generating two out-of-phase sinusoidal signals, as described in commonly assigned U.S. Pat. No. 5,023,566 of S. A. El-Hamamsy and G. Jernakoff, issued Jun. 11, 1991, which patent is incorporated by reference herein.

As in any Class-D circuit, a resonant load network is connected to the half-bridge at the junction between switching devices $Q_1$ and $Q_2$. Such a resonant load network may comprise a series, parallel or series/parallel resonant circuit, depending on the application.

In the HID lamp system illustrated in FIG. 1, the resonant load network includes a series capacitor $C_s$ which is employed both for resonant circuit tuning and blocking dc voltage. Capacitor $C_s$ is connected in series with the parallel combination of the excitation coil 16 of HID lamp 10 and a parallel tuning capacitor $C_p$. The parallel combination of capacitor $C_p$ and coil 16 functions as an impedance transformer to reflect the impedance of the arc discharge 20 into the ballast load.

As described in the Borowiec et al. patent application, Ser. No. 472,144, cited hereinabove, capacitors $C_s$ and $C_p$ are chosen to ensure impedance matching for maximum efficiency. That is, these capacitors are Chosen to ensure that the ballast load is designed for optimum values of resistance and phase angle. As described hereinabove, the excitation coil of the HID lamp acts as the primary of a loosely-coupled transformer, while the arc discharge acts as both a single-turn secondary and secondary load. The impedance of the arc discharge is reflected to the primary, or excitation coil, side of this loosely-coupled transformer. To match the ballast load impedance for maximum efficiency, the parallel capacitor operates with the excitation coil to match the proper resistive load value, and the series capacitor acts with the combination of the excitation coil and parallel capacitor to yield the required phase angle.

Figure 2:
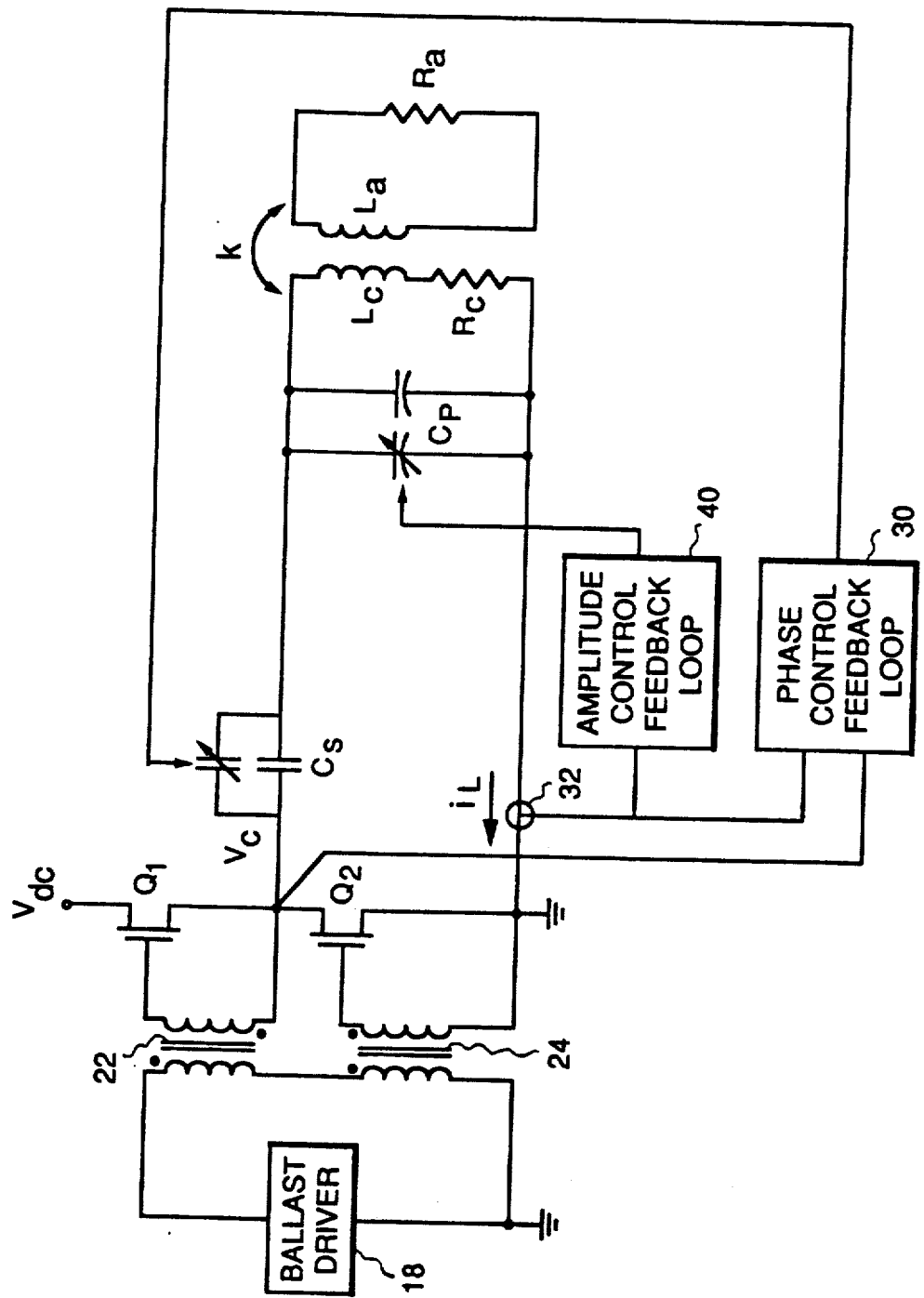
FIG. 2 is a schematic illustration of the dual feedback control system of the present invention.

FIG. 2 illustrates a dual feedback system according to the present invention for controlling both the load amplitude and phase angle via phase control feedback loop 30 and amplitude control feedback loop 40, respectively, to maximize efficiency over a wide range of load voltages. In FIG. 2, $L_c$ represents the inductance and $R_c$ represents the resistance of coil 16; $L_a$ represents the inductance and $R_a$ represents the resistance of the arc discharge; and k is the coupling coefficient between the coil and the arc discharge. In accordance with the present invention, the resonant circuit must have a variable impedance, e.g. by including a variable capacitance, a variable inductance, or a combination thereof. A suitable variable inductance may comprise, for example, a saturable core inductor of a type well-known in the art. On the other hand, a suitable variable capacitor may be of a type described in the El-Hamamsy et al. U.S. patent application, Ser. No. 534,574, cited hereinabove. In particular, the variable capacitor of the Borowiec et al. patent application comprises a fixed conductive plate and a substantially parallel, movable conductive plate with a dielectric disposed therebetween. Piezoelectric actuating means is used to vary the distance between the conductive plates by moving the movable plate with respect to the fixed plate. As a result, capacitance changes in inverse proportion to the distance moved. A control signal is provided to activate the piezoelectric actuating means to move the movable conductive plate. The control signal may provide either discrete control for movement of the movable conductive plate between a discrete number of predetermined operating positions, or it may provide continuous control for movement over a range of positions. Another suitable type of variable capacitor is a liquid crystal variable capacitor, such as that described in commonly assigned, copending U.S. patent application Ser. No. 656,665 of S. A. El-Hamamsy and C. P. Yakymyshyn, filed Feb. 19, 1991, which is incorporated by reference herein.

The phase control feedback loop 30 controls the value of variable series capacitor $C_s$ in order to optimize the phase angle of the resonant load, thereby maximizing efficiency. In particular, the impedance $Z_{in}$ of the Class-D resonant load circuit can be represented as:

$$Z_{in} = \frac{R'}{\left(1 - \left(\frac{\omega}{\omega_o}\right)^2\right)^2} + \frac{j\omega L'}{\left(1 - \left(\frac{\omega}{\omega_o}\right)^2\right)^2} - j\omega C_s,$$

where $\omega$ is the frequency of operation;

$$\omega_o = \frac{1}{\sqrt{L'C_p}}$$

is the resonant frequency of the parallel resonant circuit; and $Z' = R' + j\omega L'$ is the impedance of the coil and the reflected arc load as follows:

$$Z' = R_c + k^2\omega^2 L_c L_a \frac{R_a}{R_a^2 + X_a^2} +$$

$$j\left(\omega L_c - k^2\omega^2 L_c L_a \frac{R_a}{R_a^2 + X_a^2}\right)$$

where k is the coupling coefficient between the coil and the arc discharge, and $X_a = \omega L_a$. From the above equation for impedance $Z_{in}$, it is apparent that the value of series capacitor $C_s$ only affects the imaginary part of the load impedance. Hence, the phase angle of the load may be varied by varying the value of capacitor $C_s$, as described in U.S. patent application Ser. No. 631,836, Cited hereinabove.

Figure 3:
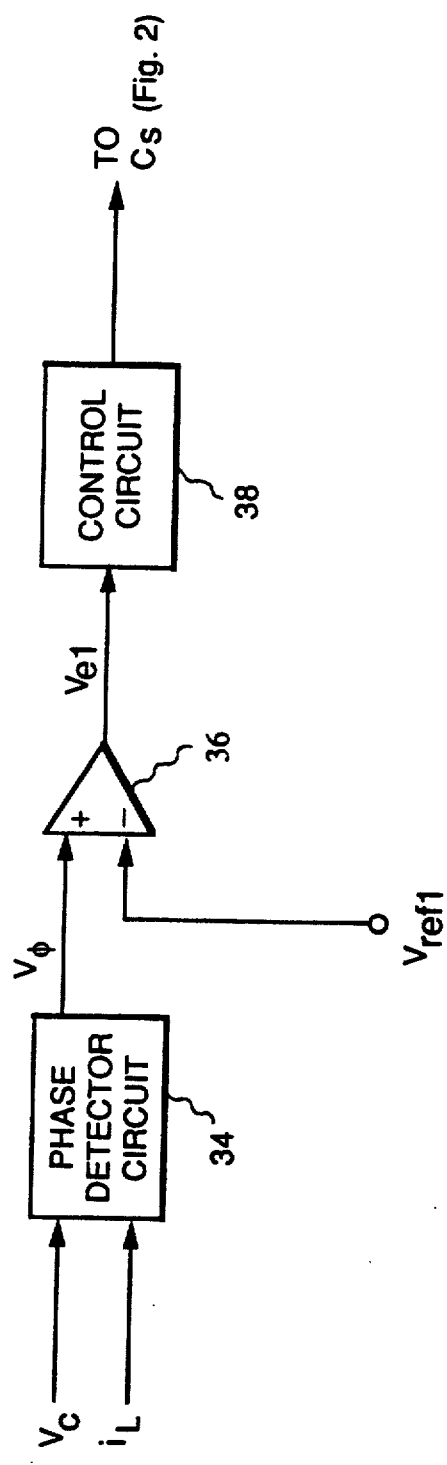
FIG. 3 is a schematic illustration of a preferred implementation of the phase control feedback loop of the present invention.

A suitable phase control feedback loop is described in U.S. patent application Ser. No. 631,836, cited hereinabove and illustrated in FIG. 3. The voltage $v_c$ is sensed by a voltage sensor (not shown), and the current $i_L$ is sensed by a current sensor 32 (FIG. 2). A suitable voltage sensor may comprise, for example, a voltage dividing network of resistors or capacitors. A suitable current sensor may comprise, for example, a Hall-effect sensor or a current viewing resistor, such as that described in commonly assigned, copending U.S. patent application Ser. No. 632,213 of S. A. El-Hamamsy, filed Dec. 21, 1990, which is incorporated by reference herein. As shown in FIG. 3, the sensed voltage and current are provided as input signals to a phase detector circuit 34 for determining the phase angle $\phi$ therebetween. The output signal from phase detector 34 comprises a voltage $V_\phi$ proportional to the measured phase angle $\phi$. The voltage $V_\phi$ is compared in an error amplifier 36 to a reference voltage $V_{ref1}$, and the resulting error signal $V_{e1}$ is supplied as the input to a control circuit 38 for continuously tuning the variable capacitor $C_s$ during all operating conditions.

In accordance with the present invention, a second feedback loop, i.e. the amplitude feedback control loop 40, is added to optimize the magnitude of the resonant load for maximum efficiency. In particular, the impedance $Z_1$ of the parallel LC circuit, including the reflected arc impedance, may be represented as:

$$Z_1 = \frac{R'}{\left(1 - \left(\frac{\omega}{\omega_o}\right)^2\right)^2} + \frac{j\omega L'}{\left(1 - \left(\frac{\omega}{\omega_o}\right)^2\right)^2},$$

From the equation for impedance $Z_1$, it is thus apparent that the value of the parallel capacitor $C_p$ affects both the real and imaginary components of the load. Therefore, to control the magnitude of the load, the amplitude feedback loop 40 controls the value of the parallel capacitor $C_p$.

Figure 4:
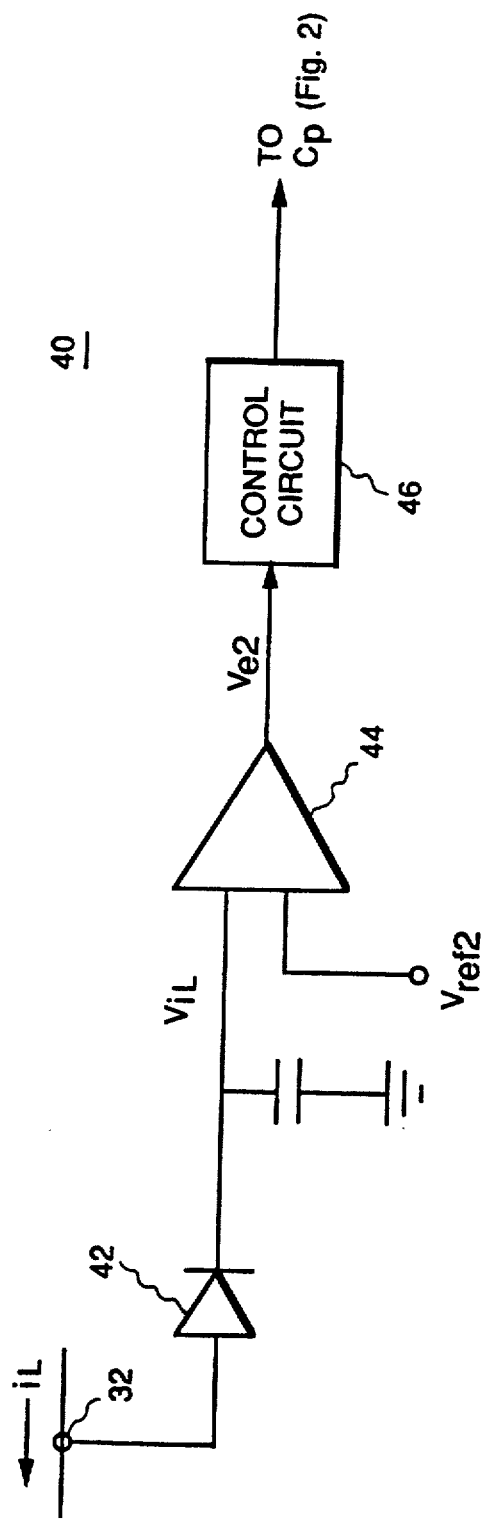
FIG. 4 is a schematic illustration of a preferred implementation of the amplitude control feedback loop of the present invention.

A preferred implementation of the amplitude feedback loop 40 is illustrated in FIG. 4. The current $i_L$ is rectified by rectifier 42 and filtered by filter capacitor $C_f$ to yield a dc voltage $V_{iL}$ that is proportional to the load current $i_L$. The voltage $V_{iL}$ is compared to a reference voltage $V_{ref2}$ in comparator 44. The resulting error voltage $V_{e2}$ is provided to a control circuit 46 for controlling the variable parallel capacitor $C_p$. For example, for a piezoelectric variable capacitor of the type described in U.S. patent application Ser. No. 631,836, cited hereinabove, a suitable control circuit comprises a pulse width modulation (PWM) circuit. A suitable PWM circuit is a type UC3525A manufactured by Unitrode Integrated Circuits Corporation.

In operation, as the parallel capacitor $C_p$ is varied by the amplitude feedback loop to match a particular load amplitude, the series capacitor is varied by the phase control feedback loop to match the particular phase angle. However, by changing the value of the series capacitor $C_s$, the magnitude of the load is affected somewhat, so that the parallel capacitor $C_p$ must again be adjusted. Hence, by a process of successive approximations, the optimal load impedance may be achieved. For an HID lamp ballast, for example, as long as the operating frequency remains in the region above the series resonant frequency and below the parallel resonant frequency, variations in the phase angle and amplitude will converge to the optimal load as long as the extent of variation of capacitors $C_s$ and $C_p$ is limited.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A dual feedback control system for a Class-D power amplifier circuit including a resonant circuit having a variable impedance, comprising:
   a phase control feedback loop, including phase detecting means for detecting the phase angle between the resonant circuit voltage and resonant circuit current, said phase control feedback loop varying the phase angle of the resonant circuit current to tune said resonant circuit under different load conditions; and
   an amplitude control feedback loop, including amplitude comparator means for comparing the amplitude of the resonant circuit impedance with a reference amplitude, said amplitude control feedback loop varying the amplitude of the resonant circuit current to tune said resonant circuit under different load conditions.

2. The dual feedback control system of claim 1 wherein:
   said resonant circuit comprises an inductance, a first variable capacitor coupled in parallel with said inductance, and a second variable capacitor coupled in series with the parallel combination of said inductance and said first variable capacitor;
   said amplitude control feedback loop varies the capacitance of said first variable capacitor; and
   said phase control feedback loop varies the capacitance of said second variable capacitor.

3. The dual feedback control system of claim 2 wherein said first and second variable capacitors each comprise piezoelectric actuating means for varying the capacitance thereof.

4. The dual feedback control system of claim 2 wherein said first and second variable capacitors each comprise liquid crystal variable capacitors.

5. A ballast for a high intensity discharge lamp of the type having an excitation coil situated about an arc tube for exciting an arc discharge in an ionizable fill contained in said arc tube, comprising:
   a Class-D power amplifier including two switching devices coupled in series in a half-bridge configuration and having an output resonant circuit coupled at the junction between said two switching devices;
   a phase control feedback loop, including phase detecting means for detecting the phase angle between the resonant circuit voltage and resonant circuit current, said phase control feedback loop varying the phase angle of the resonant circuit current to tune said resonant circuit under different load conditions; and
   an amplitude control feedback loop , including amplitude comparator means for comparing the amplitude of the resonant circuit impedance with a reference amplitude, said amplitude control feedback loop varying the amplitude of the resonant circuit current to tune said resonant circuit under different load conditions.

6. The ballast of claim 5 wherein:
   said output resonant circuit includes the inductance of said excitation coil coupled in parallel with a first variable capacitance, the parallel combination of said inductance and said first variable capacitance being coupled in series with a second variable capacitance;
   amplitude control feedback loop varies the capacitance of said first variable capacitance; and
   said phase control feedback loop varies the capacitance of said second variable capacitance.

7. The ballast of claim 6 wherein said first and second variable capacitances each comprise piezoelectric actuating means for varying the capacitance thereof.

8. The ballast of claim 6 wherein said first and second variable capacitances each comprise liquid crystal variable capacitors.

* * * * *